(12) United States Patent
Khalid et al.

(10) Patent No.: US 8,165,023 B2
(45) Date of Patent: Apr. 24, 2012

(54) METHODS FOR THE SECURED INTERCONNECTION OF VNET SITES OVER WAN

(75) Inventors: Mohamed Khalid, Cary, NC (US); Khalil Jabr, Austin, TX (US); Rajiv Asati, Morrisville, NC (US); Warren Scott Wainner, Potomac Falls, VA (US); Scott Thomas Fanning, Los Gatos, CA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 944 days.

(21) Appl. No.: 11/846,011

(22) Filed: Aug. 28, 2007

(65) Prior Publication Data

US 2009/0059914 A1 Mar. 5, 2009

(51) Int. Cl.
*H04L 12/56* (2006.01)
(52) U.S. Cl. ......................................... 370/235; 370/392
(58) Field of Classification Search .................. 370/389, 370/392, 229, 230, 231, 235, 351, 393
See application file for complete search history.

(56) References Cited

U.S. PATENT DOCUMENTS

| 5,889,777 | A * | 3/1999 | Miyao et al. | 370/395.52 |
|---|---|---|---|---|
| 6,754,211 | B1 * | 6/2004 | Brown | 370/389 |
| 7,075,932 | B2 * | 7/2006 | Matsuhira et al. | 370/395.31 |
| 7,260,648 | B2 * | 8/2007 | Tingley et al. | 709/245 |
| 7,385,973 | B1 * | 6/2008 | Johnson et al. | 370/389 |
| 7,451,241 | B2 * | 11/2008 | Behzadi | 709/251 |
| 7,586,947 | B2 * | 9/2009 | Miki et al. | 370/469 |
| 7,590,048 | B2 * | 9/2009 | Doukai | 370/217 |
| 7,606,939 | B1 * | 10/2009 | Finn | 709/246 |
| 7,633,954 | B2 * | 12/2009 | Wakayama et al. | 370/401 |
| 7,773,501 | B2 * | 8/2010 | Springer | 370/222 |
| 7,773,578 | B2 * | 8/2010 | Liu | 370/351 |
| 2002/0067725 | A1 * | 6/2002 | Oguchi et al. | 370/390 |
| 2002/0101870 | A1 * | 8/2002 | Chase et al. | 370/389 |
| 2002/0131411 | A1 * | 9/2002 | Bhatia | 370/389 |
| 2003/0053450 | A1 * | 3/2003 | Kubota et al. | 370/356 |
| 2004/0223497 | A1 * | 11/2004 | Sanderson et al. | 370/395.52 |
| 2004/0223498 | A1 * | 11/2004 | Sanderson et al. | 370/395.52 |
| 2004/0223500 | A1 * | 11/2004 | Sanderson et al. | 370/395.53 |
| 2004/0264505 | A1 * | 12/2004 | Miki et al. | 370/469 |
| 2009/0097490 | A1 * | 4/2009 | Sanderson et al. | 370/395.53 |
| 2009/0323694 | A1 * | 12/2009 | Miki et al. | 370/392 |
| 2010/0202344 | A1 * | 8/2010 | Kawakami | 370/328 |

* cited by examiner

*Primary Examiner* — Chirag Shah
*Assistant Examiner* — Jay P Patel
(74) *Attorney, Agent, or Firm* — Patterson & Sheridan LLP (57) ABSTRACT

One embodiment provides a method to interconnect virtual network segments (VNETs) defined for a local-area network (LAN) infrastructure separated by a wide-area network infrastructure. The technique involves the routing device at the LAN-WAN interconnection points to impose or dispose the VNET-shim, which encodes the VNET-id information in a Layer 4 portion of the packet. In a data plane, a new IP protocol value may be used to signify the presence of the VNET-shim followed by cryptography specific information in an IP packet. In a control plane, the routing protocol is expanded to exchange the routing information along with the VNET information.

20 Claims, 10 Drawing Sheets

METHODS FOR THE SECURED INTERCONNECTION OF VNET SITES OVER WAN

BACKGROUND OF THE INVENTION

1. Field of the Invention

Embodiments of the present invention generally relate to secured network traffic management.

2. Description of the Related Art

Network virtualization techniques have been developed that allow a local area network (LAN) to be segmented into multiple, logically discrete, virtual LAN network segments (VNETs). For example, network segmentation preservation by route distribution with segment identification, policy distribution for a given segment, and encapsulation/decapsulation for each segment may be accomplished using an Ethernet "VLAN_ID" (or other L2 identifier) indicative of the VNET segment to which a given data packet "belongs."

Passing traffic between sites segmented using VNETs over an IP wide area network (WAN) such as an MPLS/VPN connection that is provided by a service provider has been a known challenge, limiting the deployment of VNETs. One current approach for allowing a VNET segment to exist across an IP WAN has been to use generic routing encapsulation (GRE) tunnels or an overlay routing model to create multiple point-to-point connections among hosts. This approach, however, fails to provide an adequately scalable network architecture, as a separate point-to-point connection is required for each possible pair of hosts.

Accordingly, what is needed is a technique for providing a secured interconnection of virtual LAN sites over a wide area network

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention allow for interconnection of virtual local area network (LAN) segments over a wide area network (WAN). For some embodiments, a method is used to interconnect virtual LAN segments (VNETs) defined for a LAN infrastructure over a WAN infrastructure, such as a service provider's MPLS/VPN network, so as to appropriately transmit packets from one VNET enabled site to another VNET enabled site over the WAN. Further, this result is accomplished without the need for any site-to-site GRE tunnels or other overlay routing protocols. For some embodiments, a "VNET-shim" may be embedded between an IPSec header and an outer IP header of a data packet. In another embodiment, the VNET-shim may also be embedded as a confidential entity past the IPSec header. In such a case, the VNET-shim may be embedded as a confidential entity in a given packet may be used to validate that data packet when the encrypted payload is decrypted. The VNET shim header is populated from a VNET-id value in a data packet used to identify the particular VNET segment (and VRF table) associated with a given VNET.

Additionally, embodiments of the invention may utilize a new IP protocol value to mean "VNET-id followed by Encapsulating Security payload," that is, the new IP protocol value may signal the presence of an embedded VNET shim. This may assist a routing device in appropriately identifying and processing a packet that includes an embedded VNET shim. Similarly, a new community value may be used by routing protocols such as BGP, EIGRP, etc. The community value could be a standard community value or an extended community value. In a particular embodiment, the community value may encode the VNET-id of a given VNET, and bring VNET awareness to each network prefix that is advertised via the routing protocol.

When a customer edge (CE) routing device receives an IP packet from any VNET segment present on the LAN, the CE routing device may move the VNET-id from a Layer2/Layer2.5 portion of the packet and embed the VNET-id within a VNET shim that is a Layer4 construct. This effectively advances the VNET-id higher-up in the networking stack. Conversely, when a CE routing device receives an IP packet with an embedded VNET shim (e.g., from a provider edge (PE) routing device) the CE routing device may remove the VNET shim and restore the VNET-id in the Layer2/Layer2.5 construct. Additionally, the CE routing device may handle the packet according to the relevant VNET routing table, based on the packet's VNET-id value, and forward the packet to the appropriate destination.

Although the service provider network may, or may not, be aware of the VNETs available on a given customer edge (CE) routing device, special consideration is given for a VNET-aware service provider network. In that case, the PE routing device may classify a packet sent from the CE routing device based on the VNET-shim and map the packet to the correct VRF table for L3VPN processing. As is known, the VRF provides a means for the PE to create VPN customer specific routing and forwarding table. Each VPN site to which the PE router is attached is associated with its own VRF table at the PE. A data packet's IP destination address is identified in a particular VRF, if that packet arrived directly on an interface associated with that VRF. Among other things, the mapping of VNET-shim to VRF allows the different VNET segments within the customer sites to use an overlapping IP address space (if desired). Additionally, embodiments of the invention simplify the process of multicast forwarding as the Reverse Path Forwarding (RPF) check may be performed using the "virtual interface" on the CE routing device.

An Example Network Architecture

Figure 1:
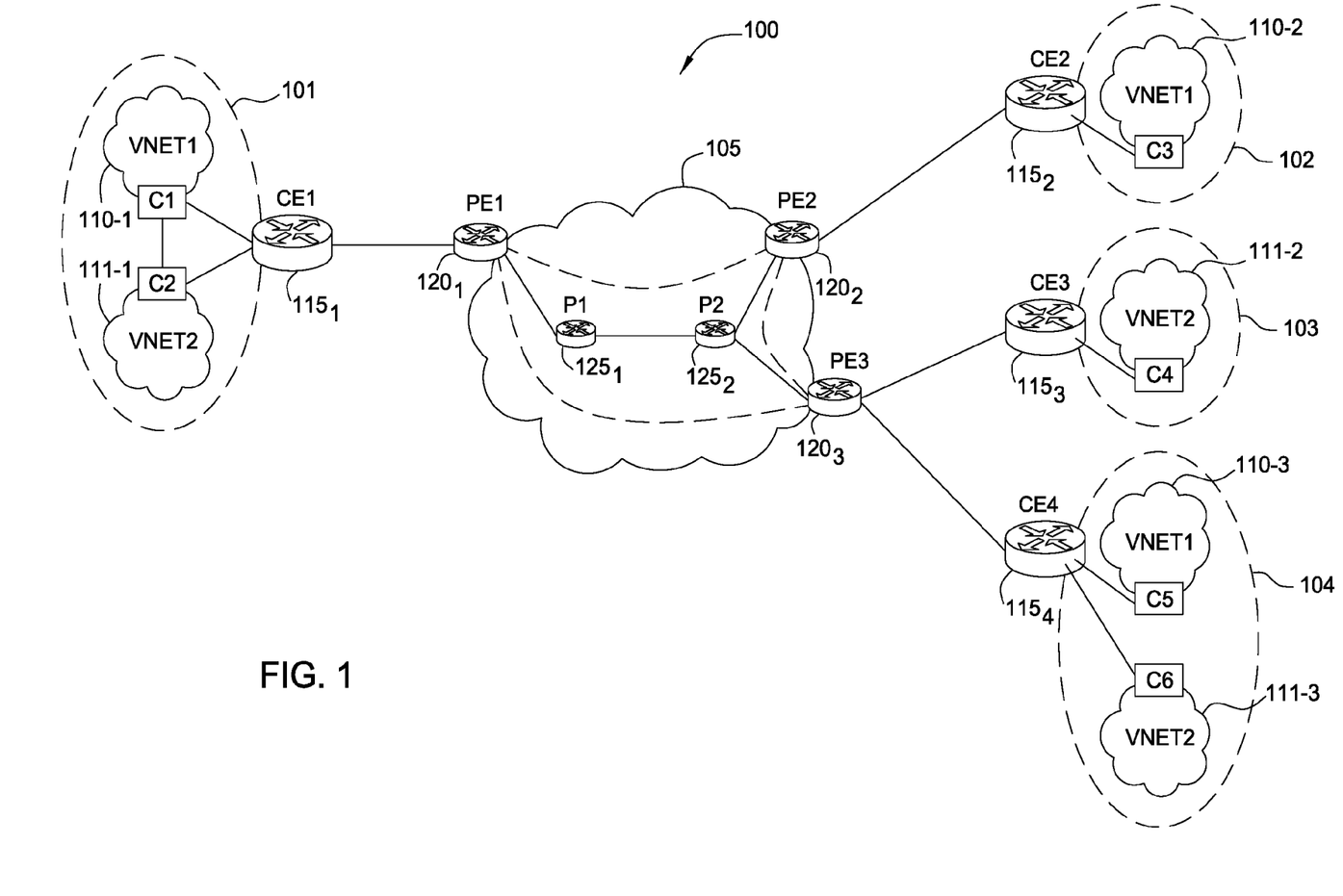
FIG. 1 illustrates an example network topology in accordance with embodiments of the present invention.

FIG. 1 illustrates one example of a network architecture 100 in which embodiments of the present invention may be utilized. The network generally includes a service provider network 105 that routes network traffic (e.g., data, voice and the like) between various customer sites 101, 102, 103 and 104. As illustrated, the customer sites 101, 102, 103 and 104 may connect to the service provider network 110 via customer edge (CE) routers 115 connected to provider edge (PE) routers 120 that are part of the provider network 105. As illustrated, the provider network 105 may also include a "fabric" of intermediate network nodes 125, such as switches and routers, that route and support traffic between the PE routers 120.

For some embodiments, the service provider network 105 may be a Multiprotocol Label Switching (MPLS) network that forwards internet protocol (IP) traffic using labels. These labels may instruct the routers and the switches in the provider network 105 where to forward packets as they are routed between PE routers 120 en route to CE routers 115 at the customer sites 101, 102, 103 and 104, based on pre-established IP routing information.

The sites 101, 102, 103 and 104 may include sites from different business entities, as well as multiple sites from the same business entity (e.g., regional branch offices and headquarters). Additionally, the local area network (LAN) running at each site may be segmented into to multiple virtual network segments (VNETs). In one embodiment, VNET identification information is embedded within each packet transmitted on a VNET-segmented site, or campus-type network, and is used to identify which virtual route forwarding table a routing device uses to make a forwarding decision. This VNET identification may be encoded in an Ethernet Virtual Local Area Network ID on Ethernet trunks between VNET-aware devices. Additional examples of systems and methods for network segmentation on a campus network are described in U.S. Patent Publication No. 2007/0058638, herein incorporated by reference in its entirety.

Further, as described above, in some cases, an organization may desire to extend the scope of a given VNET across a WAN boundary. For example, as shown in FIG. 1, site 101 includes segments 110-1 and 111-1, of VNET 1 and VNET 2, respectively, communicating with each other and with CE router $115_1$ over routers C1 and C2. Customer site 102 includes another portion of VNET 1 (segment 110-2) communicating with CE router $115_2$ over router C3. Customer site 103 includes another portion of VNET 2 (segment 111-2) communicating with CE router $115_3$ over router C4. Lastly, customer site 104 includes segments 110-3 and 111-3 of VNET 1 and VNET 2, respectively, communicating with each other and with CE router $115_3$ over routers C5 and C6.

Each of sites 101, 102, 103 and 104, includes a community edge (CE) router $115_1$, $115_2$, $115_3$ and $115_4$, connecting each site to an edge of provider network 105. For example, the CE router $115_1$ connects site 101 to PE router $120_1$. As described in grater detail below, embodiments of the invention allow the segments of VNET 1 and VNET 2 at the customer sites 101, 102, 103, 104 to communicate with one another across service provider network 105.

Interconnection of Virtual LAN Sites (VNETs) Over a WAN

Figure 2:
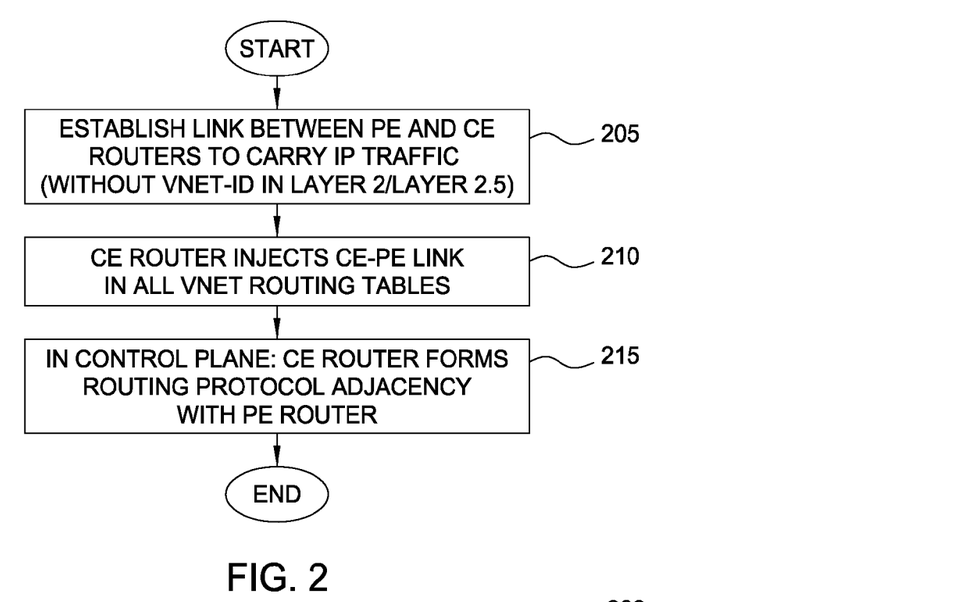
FIG. 2 illustrates a sequence of control plane operations for a customer edge routing device to communicate with a provider edge routing device to establish a secured interconnection of virtual LAN sites over a WAN, according to one embodiment of the invention.

FIG. 2 illustrates a sequence of control plane operations 200 for a CE routing device (e.g., CE routers $115_{1-4}$) to communicate with a PE routing device (e.g., PE routers $120_{1-3}$) to establish a secured interconnection VNET sites over a WAN (e.g., provider network 105), according to one embodiment of the invention.

As shown, operations 200 begin at step 205 where a CE router establishes a link over which to forward IP packets to a PE router. The CE and PE routers may use the PE-CE link to transmit IP packets back and forth between the PE router and the CE router. At step 210, The CE router installs the CE-PE link "reachability" in all the VNETs' routing tables. For example, using the network architecture 100 shown in FIG. 1, CE router $115_1$ installs the IP subnet corresponding to CE-PE link between CE router $115_1$ and PE router $120_2$ in the VNET routing tables for VNET 1 (110-1) and VNET 2 (111-1). Similarly, CE router $115_2$ installs the IP subnet corresponding to its CE-PE link to the PE router $120_2$ to the routing table for VNET 1 110-2 at site 102.

At step 210, in the control plane, the CE router forms a single routing protocol adjacency with the PE router. As part of this, in one embodiment, the CE router advertises the routes available in each VNET routing table and ensures that each advertised route is tagged with the relevant VNET-id in the community. Community is an entity that is used by routing protocol such as BGP, EIGRP etc. to signal additional information with each route. PE router may further advertise the routes to each remote PE router that may then advertise to each attached CE router. Hence, the CE router may receive the routes from the PE router and install them in the relevant VNET routing table based on their tagged VNET-id values.

For some embodiments, in which the PE router is aware of VNETs available within the customer site, the PE router may be assigned a mapping of VNET and VRF on an interface that connects to the customer site. This enables the PE router to treat each VNET segmentation as an individual VPN. That is, there is a shared link between PE-CE and based on the VNET-ID the PE maps it to the appropriate VRF/NET on the PE. Thus, the PE is aware of link between the VNET and the VRF.

Figure 3:
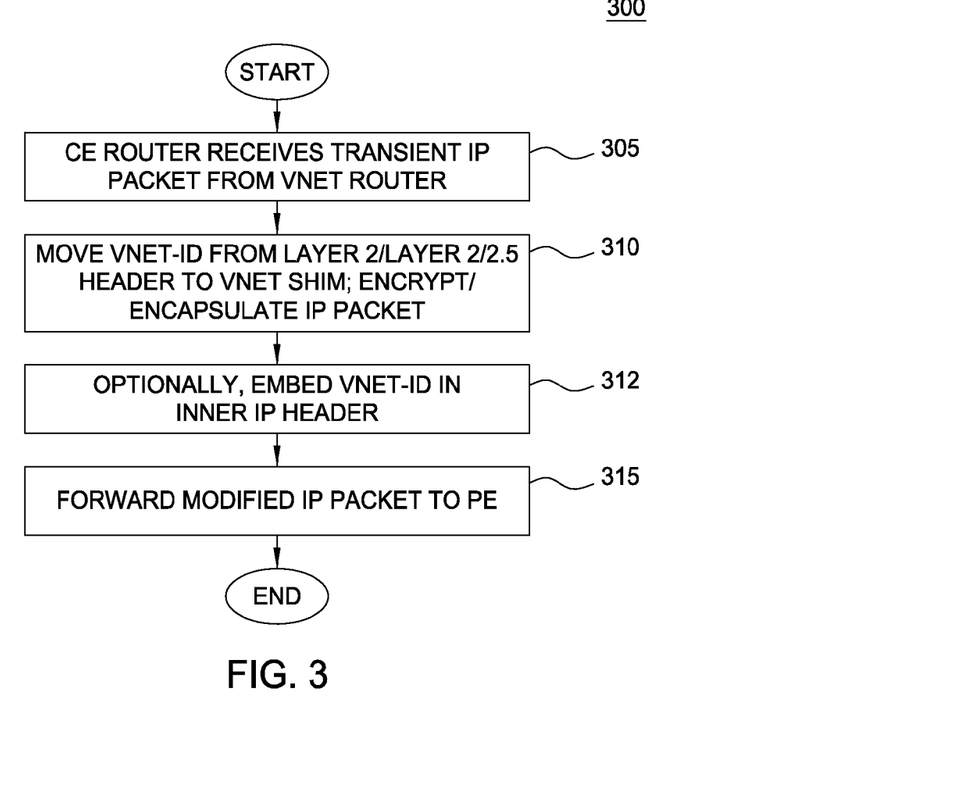
FIG. 3 illustrates a sequence of data plane operations for a customer edge routing device to process and forward a data packet, according to one embodiment of the invention.

FIG. 3 illustrates a sequence of data plane operations 300 for a CE routing device (e.g., CE router $115_1$) to process and forward a data packet, according to one embodiment of the invention. FIGS. 4-8 illustrate a packet flow according to operations 300 being used to route a data packet from segment 110-1 of VNET 1 at site 101 toward segment 110-3 of VNET 1 at site 104.

Figure 4:
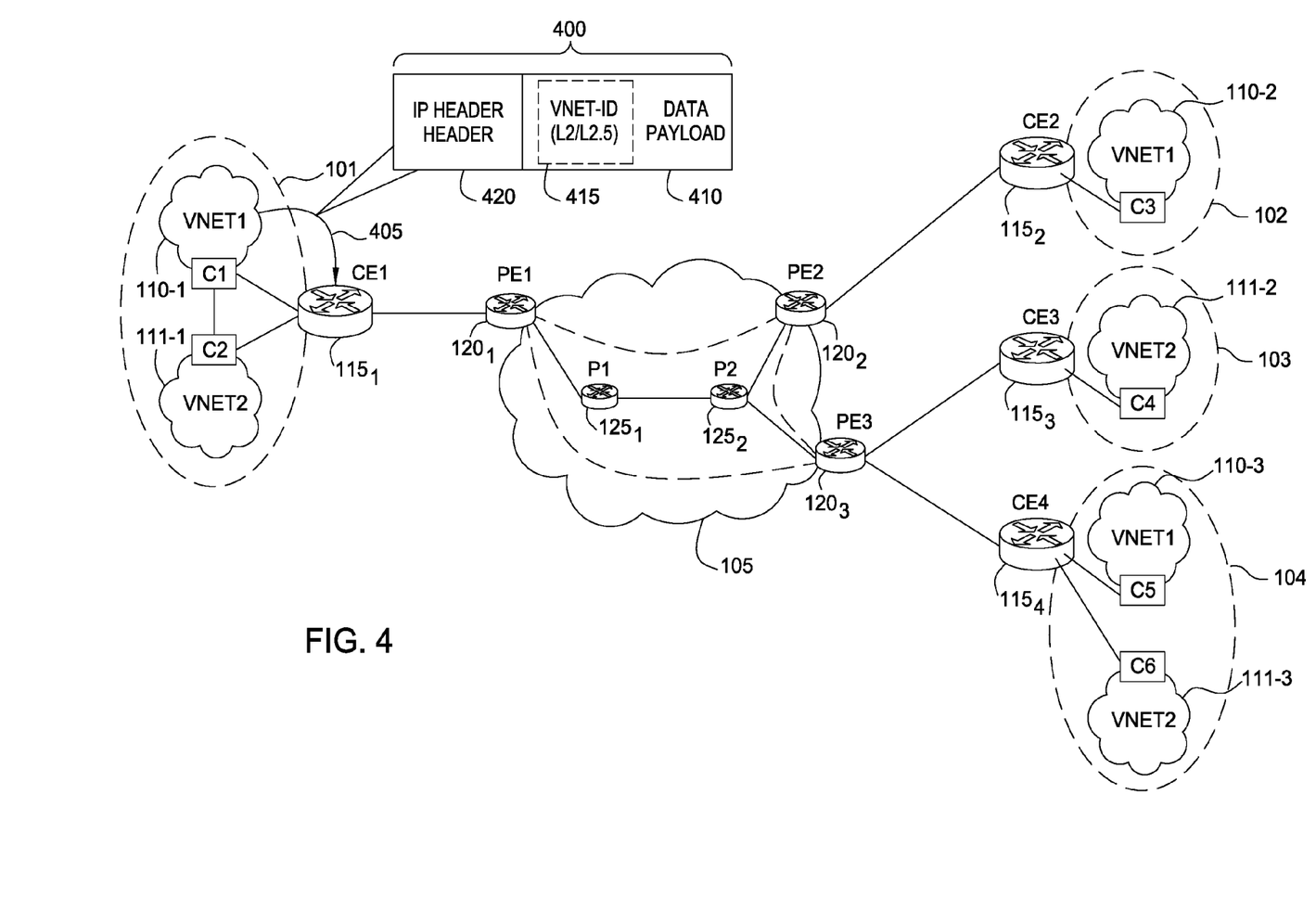
FIGS. 4-8 illustrate the example network topology of FIG. 1, during data plane operations, according to one embodiment of the invention.

As shown, operations 300 begin at step 305 where, in the data plane, the CE router receives a transient IP packet 400 (with a VNET-id in Layer2/Layer2.5 construct) from inside the customer site. For example, FIG. 4 shows packet 400 being transmitted from VNET 1 (segment 110-1) to CE router $115_1$, as represented by arrow 405. Illustratively, packet 400 includes a data payload 410, a VNET-id 415 as part of a Layer2/Layer2.5 construct, and an L3 IP header 420.

Figure 5:
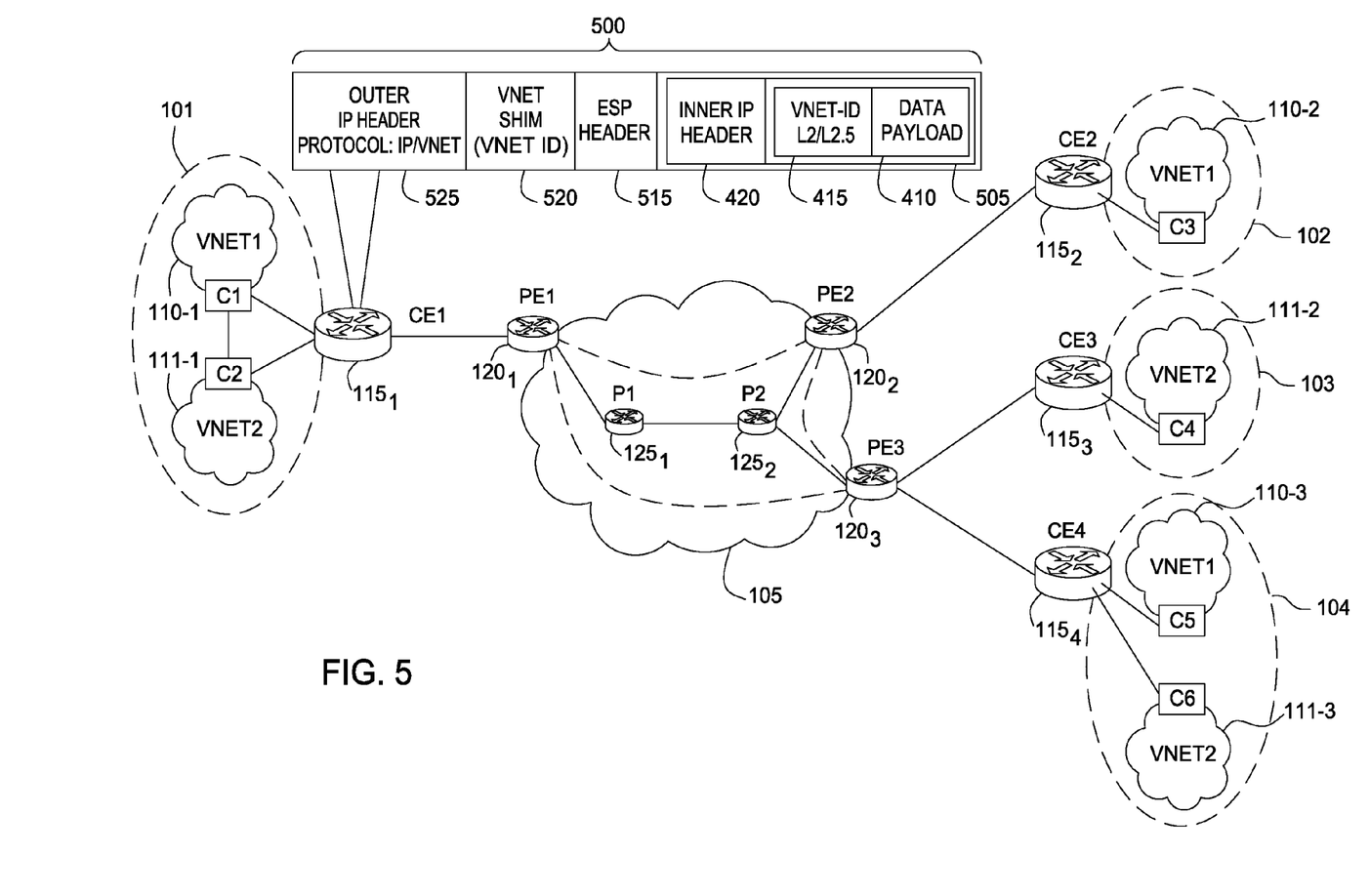

At step 310, the CE router may construct a modified IP packet by moving the VNET-id (from the Layer2/Layer2.5 construct) into a VNET-shim (in a Layer 4 construct) and removes the VNET-id from the layer2/2.5 portion of the IP packet received at step 305. The CE router may also encrypt/ encapsulate perform cryptographic operations such that the packet is encapsulated by an outer IP header. In such a case, the VNET-shim may be positioned between the outer IP header and an encapsulating security payload (ESP) header 515. In one embodiment, the IP protocol field of the outer IP header may be used to signify the presence of the VNET-shim. For example, FIG. 5 illustrates packet 500 as it transits through CE router $115_1$. As shown, packet 500 includes a data payload 505 that stores the original data payload 410, and the original IP header 420, from packet 400 of FIG. 4. Additionally packet 500 includes an ESP header 515, VNET-shim 520 and a new outer IP header 525. VNET-shim 520 embeds the VNET-id moved from the Layer2/Layer2.5 portion of the packet.

Optionally, at step 312, the CE router may also embed the VNET-id within the data payload 505. That is, the VNET-id may be embedded as a confidential entity past the ESP header 515. In such a case, the embedded VNET-shim may be used to validate that data packet when the encrypted payload is decrypted. For example, a copy of the VNET-shim may also be included in the encrypted payload portion of packet 500. On the receiving side, the encrypted payload is decrypted, and the packet may be authenticated by comparing the VNET-id in the VNET-shim with the copy of the VNET-id from the decrypted payload's VNET-shim. Thus, the encoded VNET-id may be used to provide some measure of confidence that the unencrypted VNET-id in the VNET-shim was not changed in transit, without requiring the cooperation of the PE routers or service provider network. In other words, the customer may request the service provider to honor VNET segmentation in customer sites, without also having to divulge cryptography information. This is achieved by letting a PE router (a) employ a known technique such as MPLS/VPN (documented in IETF RFC4364) to assign the VNET<->VRF mapping, (b) exchange the VNET-aware routing information, and (c) map the CE-sent packet to the relevant virtualization instance such as VRF based on the VNET-id and forward the packet towards the remote VPN site based on the relevant VRF routing and forwarding table.

Figure 6:
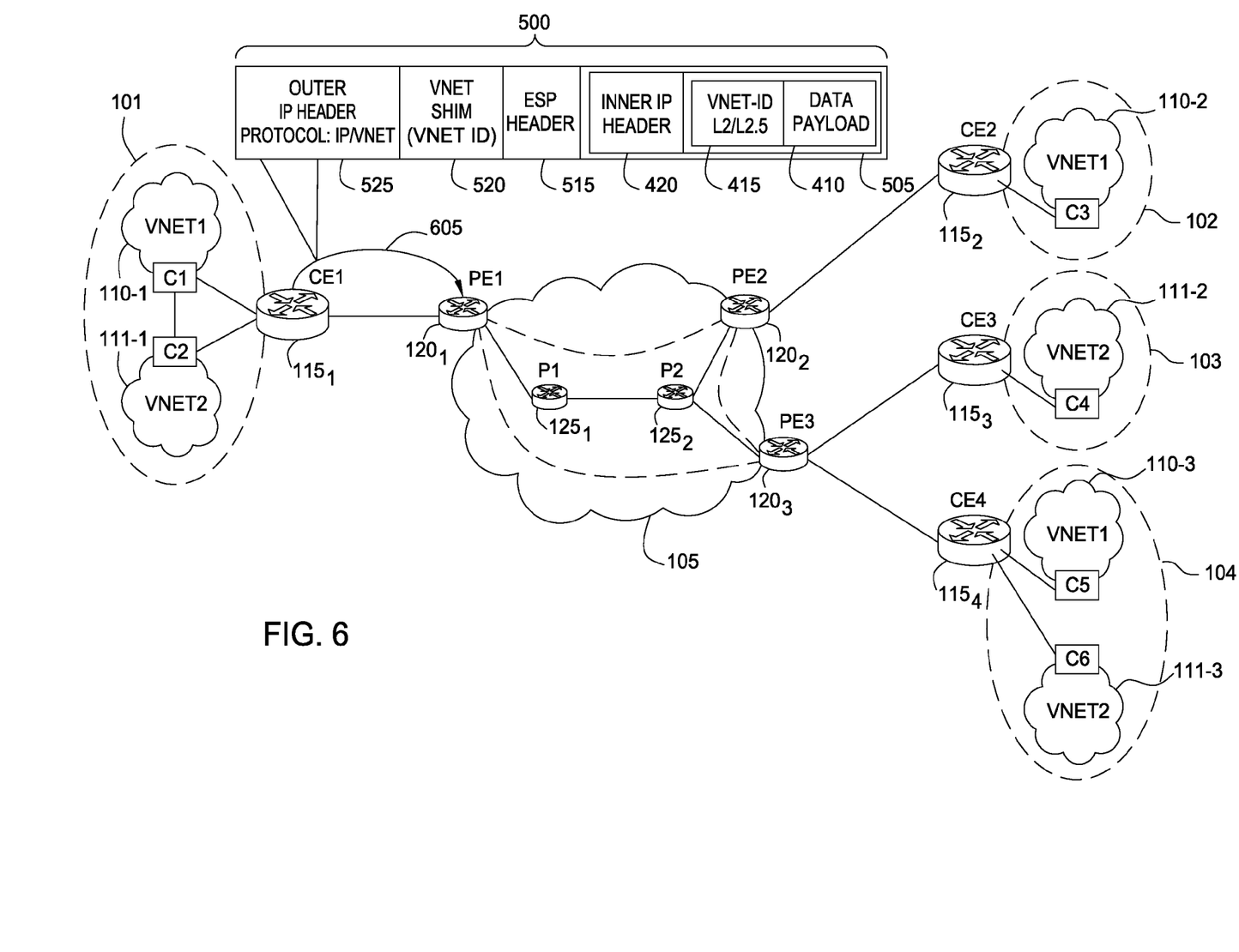

At step 315, the CE router may forward the modified IP packet (e.g., packet 500) to the PE router. More specifically, the CE router forwards the packet to the PE router for which a single routing protocol adjacency has been established in the control plane as part of operations 200. For example, FIG. 6 shows packet 500 being transmitted from CE router 115₁ to PE router 120₁, as represented by an arrow 605.

Figure 7:
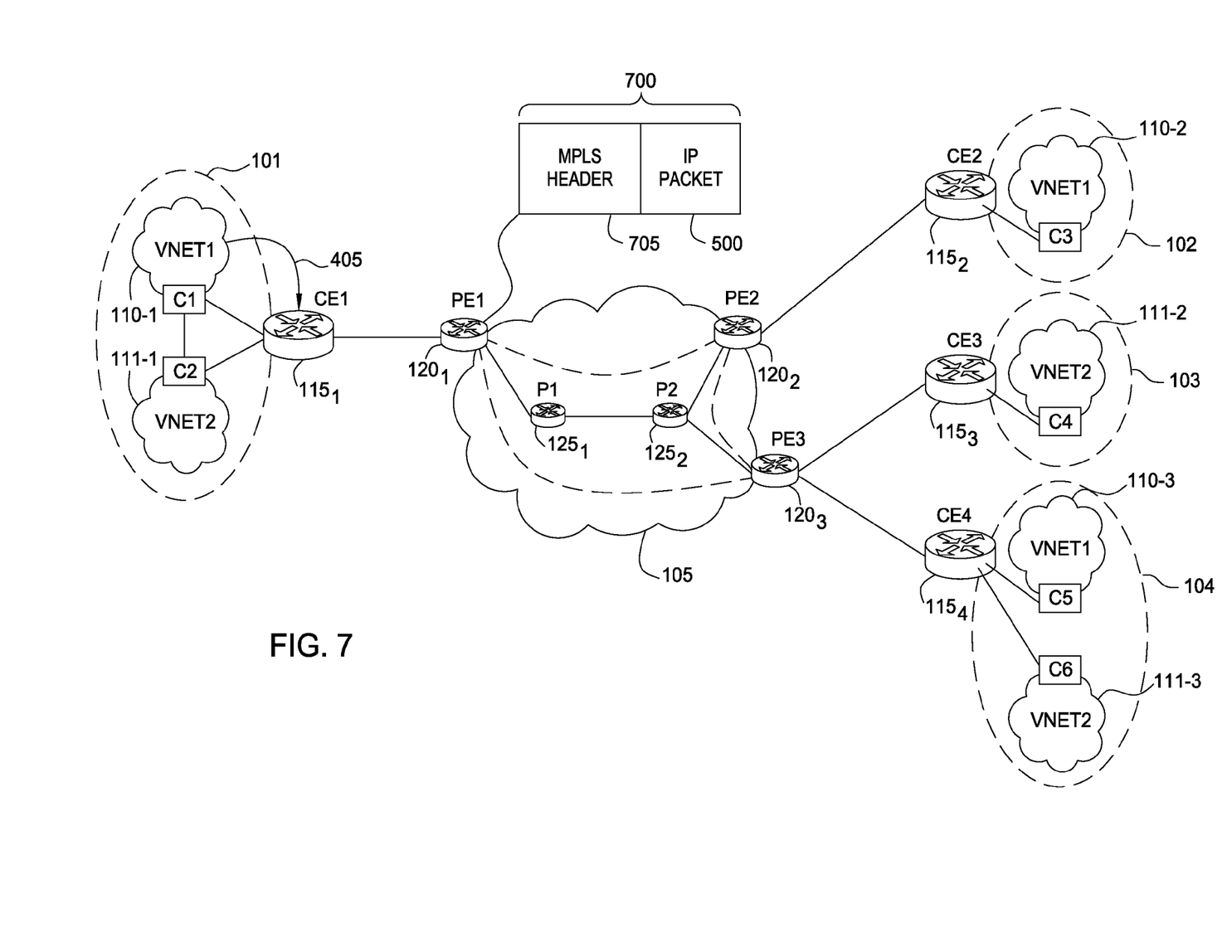
Figure 8:
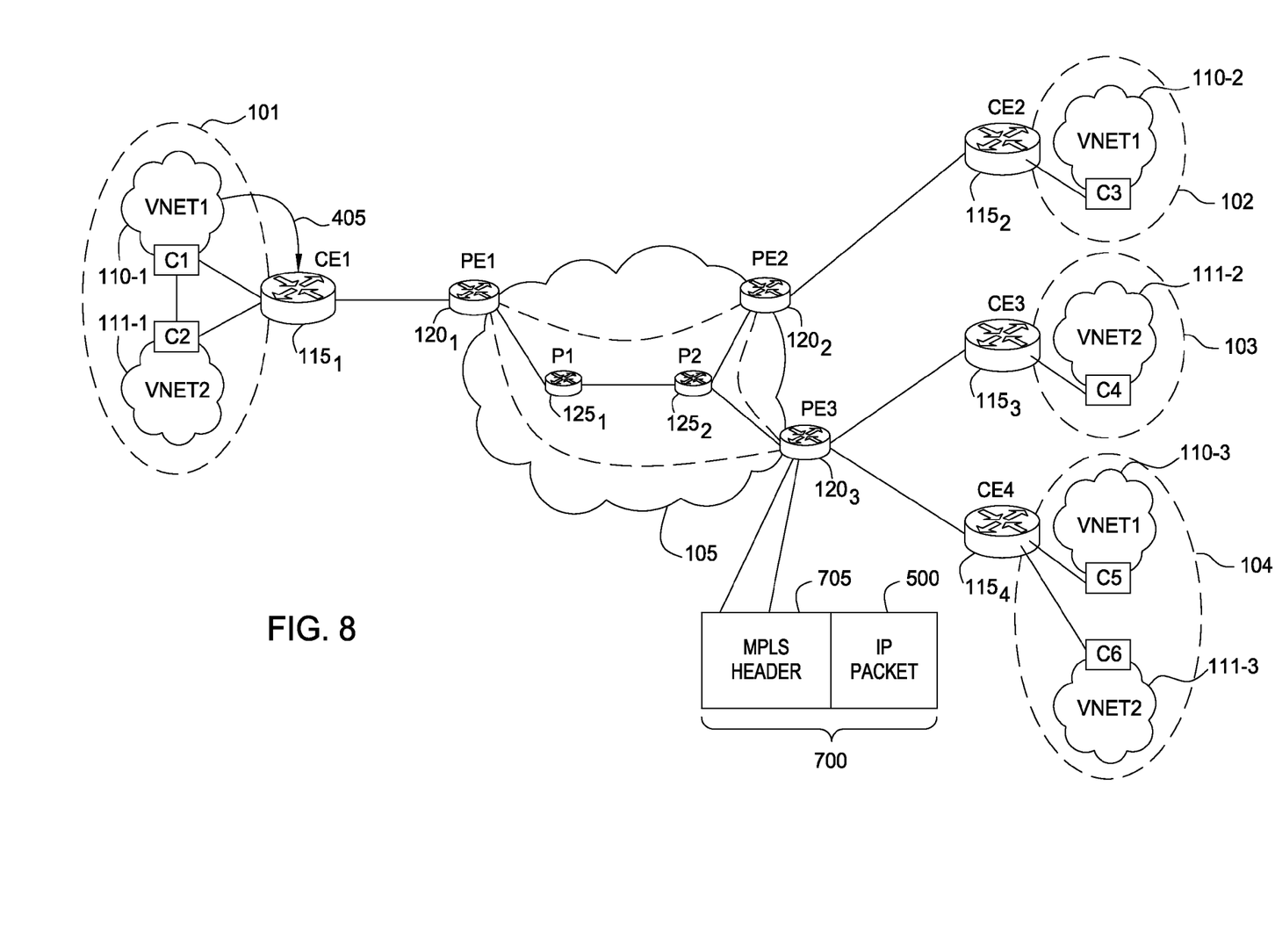

For some embodiments, the receiving PE router may convert the IP packet into an MPLS packet and forward it towards a remote PE router over the service provider's network. For example, FIG. 7 shows packet 700 in transit through PE router 120₁. As shown, packet 700 represents packet 500 encapsulated as an MPLS packet. Accordingly, packet 700 includes the encapsulated IP packet 500 and an MPLS header 705. FIG. 8 shows packet 500 after it has been transited through the service provider network 105 and received by received by PE router 120₃. In one embodiment, PE router 120₃ then transmits the MPLS packet to a CE router. In this example, packet 500 is forwarded to CE router 115₄, which may be configured to process the packet, as described below.

Additionally, for some embodiments, the PE router may be "VNET aware." That is, the PE router may recognize the VNET-id encoded in the VNET-shim to determine the VNET to which the packet "belongs." In such a case, at step 315, when the CE router forwards the modified IP packet to the PE router, the PE router may be configured to map the modified IP packet (with the VNET-shim) to the relevant VNET context, (i.e., VRF) by simply classifying the packet based on the VNET-shim value. Further, in such a case, the PE router may be configured to perform a destination IP address look-up in the mapped VNET routing table and to convert the IP packet into an MPLS packet and forward it towards a remote PE router.

Figure 9:
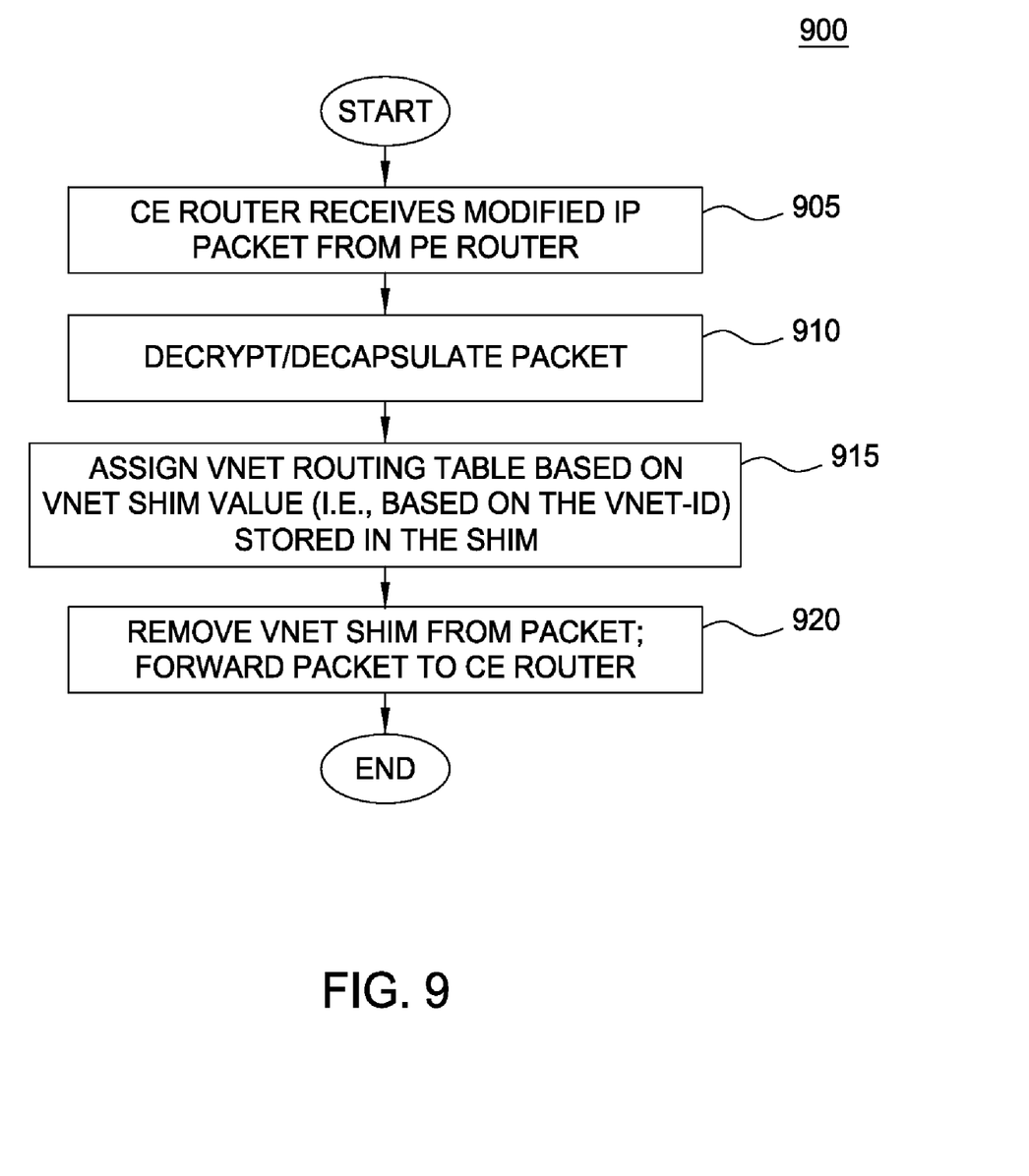
FIG. 9 illustrates a sequence of data plane operations for a customer edge routing device to receive and forward a data packet destined for a particular virtual LAN segment, according to one embodiment of the invention.
Figure 10:
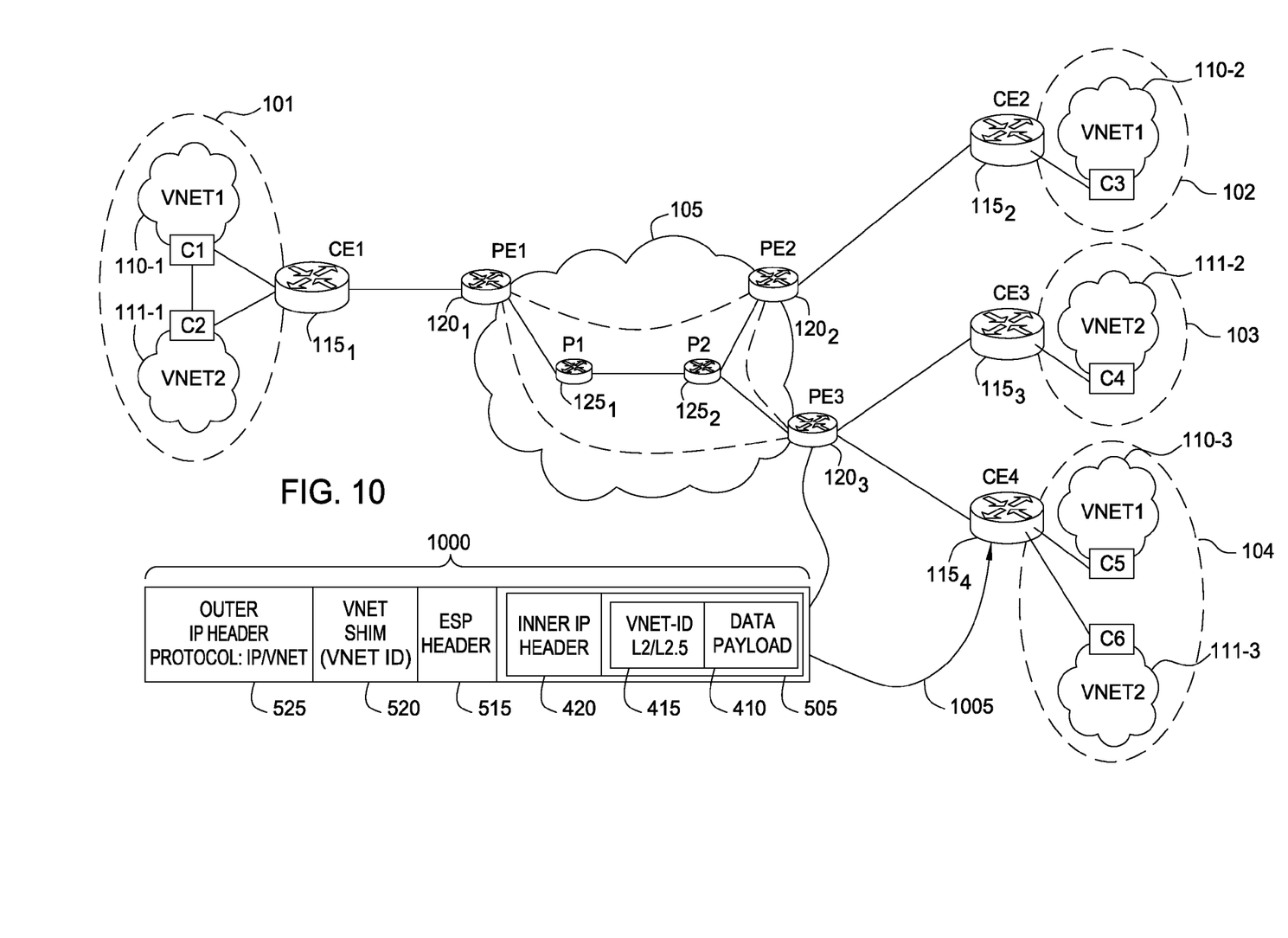
FIGS. 10-11 illustrate a portion of the example network topology of FIG. 1, during the data plane operations of FIG. 9, according to one embodiment of the invention.
Figure 11:
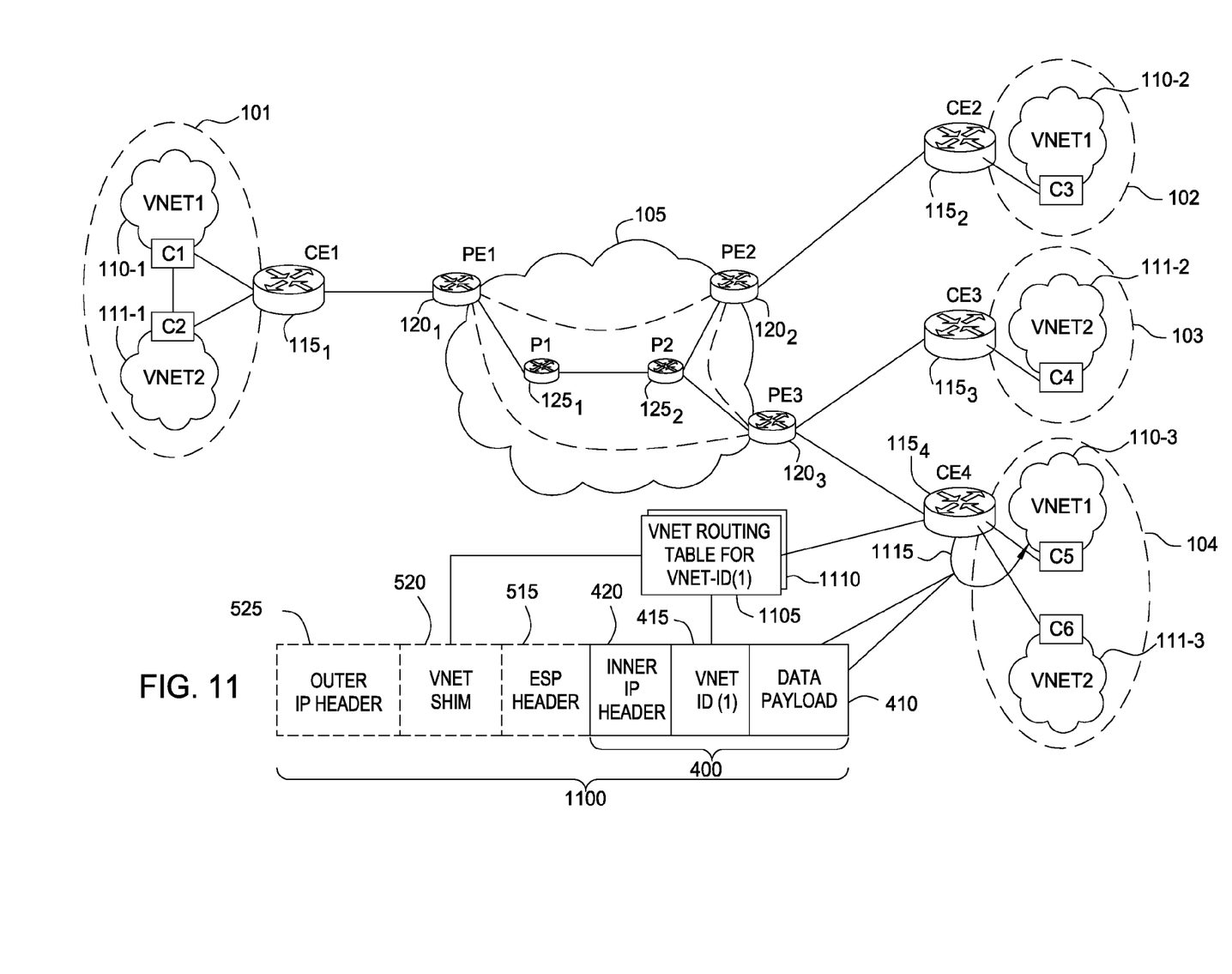

FIG. 9 illustrates a sequence of data plane operations 900 for a CE routing device (e.g., CE router 115₄) to receive and forward a data packet destined for a particular VNET segment, according to one embodiment of the invention. FIGS. 10-11 illustrate an example of operations 900 being used to route a data packet from received from PE router 120₃ through CE router 115₄ toward segment 110-3 of VNET 1 at site 104.

As shown, operations 900 begin at step 905 where, in the data plane, the CE router receives an IP packet (with an embedded VNET-shim in layer4) from a PE router. For example, FIG. 10 shows PE router 115₃ forwarding packet 1000 toward CE router 115₄, as represented by arrow 1005. Illustratively, PE router 120₃ has removed the MPLS labels, restoring packet 1000 to the same state it was in after processing by PE router 120₁. That is, packet 1000 of FIG. 10 corresponds to packet 500 of FIG. 5, after it has been transited through provider network 105. Accordingly, packet 1000 includes the outer IP header 525, the VNET shim 520, tge ESP header 525, and the ESP data payload 505.

At step 910, the receiving CE router may be configured to decrypt and/or de-capsulate the packet received at step 905. At step 915, the CE router may assign the packet to the relevant VNET routing table based on the VNET-id stored in the VNET-shim header. For example, FIG. 11 shows packet 1100 in transit through CE router 115₁. As shown, the VNET-id embedded in VNET-shim 520 is used to identify the correct VNET routing table to assign to this packet. In this case, routing table 1105, (routing table 1110 may be associated with VNET 2 at site 104).

At step 920, the CE router may remove the VNET-shim and restore the VNET-id to the layer2/Layer2.5 construct. For example, FIG. 11 shows the VNET-id being removed from the VNET-shim 1120, and restored to its original location, as represented by an arrow 1125. That is, the CE router 115₄ may restore packet 400 of FIG. 4 from packet 1100, including restoring the VNET-id. Once processed, the CE router 115₄ may forward the IP packet to the appropriate internal customer site router. Illustratively, FIG. 11 shows packet 400 (after the being decapsulated and decrypted from packet 500, and after the VNET ID is restored to layer2/layer2.5) being transmitted from CE router 120₄ to segment 110-3 of VNET 1, as represented by an arrow 1115.

Advantageously, embodiments of the invention may be used to interconnect VNET sites over a WAN, without requiring point-to-point GRE connections and avoiding the use of overlay routing protocol inside tunnels. Thus, embodiments of the invention preserve the simplicity of VNET architecture beyond a single LAN environment. Further, a single PE-CE link may be used to support more than one VNET segment inside a given customer site. Furthermore, when the PE is "VNET aware," then the customer site may deploy overlapping IP addresses within different VNETs at the same customer site.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, at a first routing device, a packet, wherein the packet includes an identifier indicative of one of a plurality of virtual network segments (VNETs) defined for local-area network (LAN) infrastructures separated by a wide-area network infrastructure, and wherein the identifier is stored in a layer 2 portion of the packet;
   generating a modified packet by removing the identifier from the layer 2 portion of the packet and storing the identifier in a VNET-shim embedded within the packet, wherein the VNET-shim is embedded in between an outer IP header and an encapsulating security payload header of the modified packet, and wherein a copy of the VNET-shim resides within an encrypted payload of the modified packet; and
   forwarding the modified packet towards a destination in the wide-area network infrastructure.

2. The method of claim 1, wherein the encapsulating security payload header of the modified packet is an IPSEC header.

3. The method of claim 1, wherein the VNET-shim is embedded confidentially after an encapsulating security payload header between an inner IP header and a data payload of the packet.

4. The method of claim 1, further comprising:
receiving the modified packet at a second routing device;
retrieving the identifier from the VNET-shim,
handling the modified packet in a specific routing table maintained by the second routing device, based on the identifier retrieved from the VNET-shim;
removing the VNET shim from the modified packet and restoring the identifier to the layer 2 portion of the modified packet; and
forwarding the packet with the restored identifier to a VNET segment identified by the identifier.

5. The method of claim 4, further comprising, in a control plane of the first routing device, and prior to receiving the packet:
advertising to the second routing device, by the first routing device, routes from one or more VNET routing tables such that each route is tagged with a community value that encodes a given VNET-id.

6. The method of claim 5, further comprising:
receiving, by the second routing device, the routes from the first routing device; and
installing each route in a corresponding VNET routing table, based on the community value associated with a given route.

7. The method of claim 5, further comprising, in a control plane of the second routing device:
receiving a plurality of routes from the first routing device;
installing the routes in a single routing table at the second routing device, while ignoring the community values; and
advertising the routes and the community values to other routing devices.

8. The method of claim 5, wherein the second routing device is VNET-aware, and further comprising, in a control plane of the second routing device:
receiving a plurality of routes from the first routing device;
installing each route in a specific VRF routing table, based on the community value that encodes a given VNET-id; and
advertising the routes along with the community values to other routing devices.

9. The method of claim 4, wherein the second routing device is configured to encapsulate the modified packet in an MPLS header at the ingress point, and decapsulate the modified packet at the egress point.

10. The method of claim 9, wherein the second routing device is configured to recognize the modified packet according to the embedded VNET-shim, and to assign the packet to the mapped VRF, and to forward the packet according to the VRF routing table.

11. A system, comprising:
a first routing device comprising:
a processor;
a networking interface; and
a memory containing instructions for a first routing program, wherein the first routing program is configured to:
receive a packet, wherein the packet includes an identifier indicative of one of a plurality of virtual network segments (VNETs) defined for local-area network (LAN) infrastructures separated by a wide-area network infrastructure, and wherein the identifier is stored in a layer 2 portion of the packet,
generate a modified packet by removing the identifier from the layer 2 portion of the packet and storing the identifier in a VNET-shim embedded within the modified packet, wherein the VNET-shim is embedded in between an outer IP header and an encapsulating security payload header of the modified packet and wherein a copy of the VNET-shim resides within an encrypted payload of the modified packet, and
forward the modified packet towards a destination in the wide-area network infrastructure.

12. The system of claim 11, wherein the encapsulating security payload header of the modified packet is an IPSEC header.

13. The system of claim 11, wherein the VNET-shim is embedded confidentially after an encapsulating security payload header between an inner IP header and a data payload of the packet.

14. The system of claim 11, wherein the first routing program is further configured to:
in a control plane of the first routing device, and prior to receiving the packet:
advertise to a second routing device, routes from one or more VNET routing tables such that each route is tagged with a community value that encodes a given VNET-id.

15. A system, comprising:
a second routing device, comprising:
a processor;
a networking interface; and
a memory, containing instructions for a second routing program, wherein the second routing program is configured to:
receive a packet modified to include an identifier indicative of one of a plurality of virtual network segments (VNETs) defined for local-area network (LAN) infrastructures separated by a wide-area network infrastructure, and wherein the identifier is stored in a VNET shim, and wherein the VNET-shim is embedded in between an outer IP header and an IPSEC payload header of the modified packet and wherein a copy of the VNET-shim resides within an encrypted payload of the modified packet,
retrieve the identifier from the VNET-shim,
handle the modified packet in a specific routing table maintained by the second routing device, based on the identifier retrieved from the VNET-shim,
remove the VNET shim from the modified packet,
restore the identifier to the layer 2 portion of the modified packet, and
forward the packet with the restored identifier to a VNET segment identified by the identifier, wherein the VNET segment identified by the identifier is in the wide-area network infrastructure.

16. The system of claim 15, wherein the second routing program is further configured to:
receive a plurality of routes from one or more VNET routing tables such that each route is tagged with a community value that encodes a given VNET-id; and
install each route in a corresponding VNET routing table, based on a community value associated with a given route.

17. The system of claim 15, wherein the second routing program is further configured to:

receive a plurality of routes from one or more VNET routing tables such that each route is tagged with a community value that encodes a given VNET-id;
install the routes in a single routing table at the second routing device, while ignoring the community values; and
advertise, to other routing devices, the routes along with the community values.

18. The system of claim 15, wherein the second routing program is further configured to:
receive a plurality of routes from one or more VNET routing tables such that each route is tagged with a community value that encodes a given VNET-id;
install each route in a specific VRF routing table, based on the community value that encodes a given VNET-id; and
advertise the routes along with the community values to other routing devices.

19. A method, comprising:
receiving, at a first routing device, a packet that includes an identifier stored in a layer 2 portion of the packet indicative of one of a plurality of virtual network segments (VNETs) defined for a local-area network (LAN) infrastructure separated by a wide-area network infrastructure;
removing the identifier from the layer 2 portion of the packet;
storing the identifier in a VNET-shim embedded within the packet, wherein the VNET-shim resides in a layer 4 portion of the packet; and
forwarding the modified packet towards a destination in the wide-area network infrastructure.

20. The method of claim 19, further comprising:
receiving the modified packet at a second routing device;
retrieving the identifier from the VNET-shim,
handling the modified packet in a specific routing table maintained by the second routing device, based on the identifier retrieved from the VNET-shim;
removing the VNET shim from the modified packet and restoring the identifier to the layer 2 portion of the modified packet; and
forwarding the packet with the restored identifier to a VNET segment identified by the identifier.

* * * * *

UNITED STATES PATENT AND TRADEMARK OFFICE
CERTIFICATE OF CORRECTION

PATENT NO. : 8,165,023 B2
APPLICATION NO. : 11/846011
DATED : April 24, 2012
INVENTOR(S) : Khalid et al.

Page 1 of 1

It is certified that error appears in the above-identified patent and that said Letters Patent is hereby corrected as shown below:

In Description of Example Embodiments:

Column 3, Line 53, please delete "grater" and insert --greater-- therefor;

Column 4, Line 28, please delete "VRF/NET" and insert --VRF/VNET-- therefor.

Signed and Sealed this
Fourteenth Day of August, 2012

David J. Kappos
*Director of the United States Patent and Trademark Office*